(12) United States Patent
Tipper et al.

(10) Patent No.: US 11,920,978 B2
(45) Date of Patent: Mar. 5, 2024

(54) METHOD AND APPARATUS FOR DETECTING PULSED RADIATION

(71) Applicant: THE SECRETARY OF STATE FOR DEFENCE, Salisbury (GB)

(72) Inventors: Sean Michael Tsi-Ong Tipper, Salisbury (GB); Christopher David Burgess, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 563 days.

(21) Appl. No.: 17/054,411

(22) PCT Filed: May 22, 2019

(86) PCT No.: PCT/GB2019/000072
§ 371 (c)(1),
(2) Date: Nov. 10, 2020

(87) PCT Pub. No.: WO2019/229405
PCT Pub. Date: Dec. 5, 2019

(65) Prior Publication Data
US 2021/0247231 A1    Aug. 12, 2021

(30) Foreign Application Priority Data

Jun. 1, 2018    (GB) ...................................... 1808980

(51) Int. Cl.
*G01J 1/44* (2006.01)
*G01J 1/42* (2006.01)
*G02B 26/02* (2006.01)

(52) U.S. Cl.
CPC ................ *G01J 1/44* (2013.01); *G02B 26/02* (2013.01); *G01J 2001/4238* (2013.01); *G01J 2001/448* (2013.01)

(58) Field of Classification Search
CPC ................ G01J 1/44; G01J 2001/4238; G01J 2001/448; G02B 26/02
See application file for complete search history.

(56) References Cited

U.S. PATENT DOCUMENTS

| 4,760,537 A | 7/1988 | Martin et al. |
| 5,047,620 A * | 9/1991 | Durvasula ................. G01J 9/00 250/208.2 |

(Continued)

OTHER PUBLICATIONS

International Patent Application No. PCT/GB2019/000072, International Preliminary Report on Patentability dated Dec. 10, 2020, 7 pages.

(Continued)

*Primary Examiner* — Tri T Ton
*Assistant Examiner* — Jarreas Underwood
(74) *Attorney, Agent, or Firm* — Kilpatrick Townsend & Stockton LLP

(57) ABSTRACT

A method of detecting pulsed radiation comprising the steps of irradiating at least a portion of an array of sensor elements with pulsed radiation (71); addressing the array using a rolling shutter operation (72); reading the array to obtain a radiation image (73); and then applying a pulse detection operation (74) to the radiation image. The rolling shutter operation (72) is configured to address each element line of the array for a predetermined integration period. The predetermined integration period being calculated using an integration period function, itself a function of an anticipated pulse repetition interval of the pulsed radiation. The method and apparatus for the same enable low cost camera arrays to be used for pulse detection and for wider application in the field of low cost communications.

17 Claims, 9 Drawing Sheets

(56) References Cited

U.S. PATENT DOCUMENTS

| | | | |
|---|---|---|---|
| 7,223,956 B2* | 5/2007 | Yoshida | H04N 23/74 348/E3.019 |
| 7,471,315 B2* | 12/2008 | Silsby | H04N 23/70 348/226.1 |
| 8,150,255 B2* | 4/2012 | Tsai | G03B 9/70 396/180 |
| 11,146,747 B1* | 10/2021 | Zhang | H04N 13/254 |
| 2011/0019022 A1* | 1/2011 | Airey | H04N 25/77 348/222.1 |
| 2012/0148162 A1* | 6/2012 | Zhang | G06T 7/11 382/195 |
| 2012/0327251 A1* | 12/2012 | Majewicz | H04N 23/72 348/E17.002 |
| 2013/0028612 A1* | 1/2013 | Ryan | G01S 5/16 398/172 |
| 2014/0048688 A1* | 2/2014 | Seo | G06T 7/194 250/208.1 |
| 2014/0316196 A1* | 10/2014 | Wichern | A61B 1/0684 600/109 |
| 2015/0002734 A1* | 1/2015 | Lee | G06F 3/0304 348/367 |
| 2017/0064178 A1* | 3/2017 | Kagawa | G02B 23/2469 |
| 2018/0165537 A1* | 6/2018 | Ackerman | G06V 40/19 |
| 2018/0301589 A1* | 10/2018 | Burroughs | H01L 25/50 |
| 2018/0374230 A1* | 12/2018 | Narasimhan | H04N 13/207 |

OTHER PUBLICATIONS

United Kingdom Patent Application No. GB1808980.5, Search Report dated Nov. 30, 2018, 4 pages.
International Patent Application No. PCT/GB2019/000072, International Search Report and Written Opinion dated Jul. 26, 2019, 10 pages.
United Kingdom Patent Application No. GB1907210.7, Combined Search and Examination Report dated Nov. 15, 2019, 7 pages.

* cited by examiner

Figure 1a – PRIOR ART

METHOD AND APPARATUS FOR DETECTING PULSED RADIATION

TECHNICAL FIELD OF THE INVENTION

This invention relates to the field of detecting pulsed radiation, in particular to methods and apparatus suitable for use in detecting pulsed laser radiation.

BACKGROUND TO THE INVENTION

A radiation source such as an LED, laser diode, or laser, may output continuous wave radiation, or may output radiation that is modulated. For instance a radiation source may be switched on and off, to generate pulses of radiation, or alternatively the radiation source may output continuous uninterrupted radiation, with that radiation being modulated by a separate device, such as a chopper or electro-optic modulator. The radiation source may intrinsically generate pulsed radiation, such as the nanosecond pulses generated by a Q-switched laser. The time interval between radiation pulses in pulsed radiation is commonly referred to as the pulse repetition interval (the inverse thereof being the pulse repetition frequency).

Lasers are used in a wide range of applications including use as a means for alignment, range finding, guidance, drilling and cutting, communication, and for interrogating a surface such as that of a compact disc. A laser generates a beam of coherent monochromatic electromagnetic radiation that is typically of low divergence and therefore can be used to provide high irradiance onto a target. Pulsed lasers in particular may also be used to deliver temporally short, high intensity, pulses of power to an unknowing receiver, with the intent being to damage or disable the receiver. Alternatively the low divergence of a laser, can be exploited in communications to deliver a relatively higher irradiance at range compared to other light sources. Advantageously, pulsed laser radiation can thus be exploited to encode information that can be communicated between a sender and receiver.

Owing to the wide application of lasers, there exists a wide requirement for laser detection. Laser radiation can be detected by a simple photodiode, however to identify the radiation specifically as that of a laser, a specialist laser detector may be required. Laser detectors are suitable for receiving low divergence and potentially high irradiance radiation. Depending on the application, specialist photodiodes, photodetectors, or arrays thereof, and laser beam profiling equipment, are available, but the specialist nature of these applications can make such equipment expensive. Furthermore a laser operated in a pulsed manner can require even more specialist equipment for detection, optimised for the specific pulse repetition intervals/repetition frequencies intrinsic to the pulsed laser radiation, and the decoding of information contained therein.

Therefore it is an aim of the present invention to provide an alternative method and apparatus for detecting pulsed radiation.

SUMMARY OF THE INVENTION

According to a first aspect of the invention there is provided a method of detecting pulsed radiation comprising the steps of: Providing an array of sensor elements, the sensor elements being arranged in element lines; receiving the pulsed radiation; irradiating at least a portion of the array of sensor elements with the pulsed radiation; addressing the array of sensor elements using a rolling shutter operation; reading the array of sensor elements to obtain a radiation image; and then applying a pulse detection operation to the radiation image, thereby detecting the pulsed radiation; wherein the step of addressing the array of sensor elements comprises: Calculating a predetermined integration period using an integration period function, the integration period function being a function of an anticipated pulse repetition interval of the pulsed radiation; configuring the rolling shutter operation to address each of the element lines for the predetermined integration period; and then addressing the element lines.

Pulsed radiation is electromagnetic radiation in the form of pulses repeating at a pulse repetition interval. The term 'pulse repetition interval' is intended to include single pulses of radiation (for which the actual time interval between pulses can be considered as infinite). The pulses themselves are discretely separate from each other in time. A pulse may have constant amplitude during its 'on' period, or may have variable amplitude, for instance further modulation may be present on the pulse itself for communication purposes. Radiation may be generated through use of a radiation source such as an LED, laser diode, or a laser. The pulsed radiation may be generated directly by the radiation source (for instance a laser switched on and off, or a Q-switched laser) or may be generated by the radiation source outputting continuous radiation that is then modulated (for instance by an electro-optic modulator).

A sensor element means a device that is suitable for detecting electromagnetic radiation that has the wavelength of the pulsed radiation. The sensor element itself converts the pulsed radiation incident upon it to electrical energy. The material of which the sensor element is formed will be dependent therefore upon the wavelength of the pulsed radiation intended to be detected.

The array of sensor elements is a plurality of sensor elements arranged in at least one dimension, as a plurality of element lines. Each element line being a linear distribution of sensor elements and may refer to a row of, for instance, a two dimensional array or a column of a two dimensional array. Each sensor element in the element array is electrically isolated, such that the electrical energy generated by each element can be individually determined. An example of such an array is a CMOS sensor.

A radiation image of a scene can be obtained by measuring the electrical energy generated by each sensor element in an array of sensor elements, such as a CMOS sensor in a camera. For the invention to be realised, the pulsed radiation must be received by at least two, preferably more, element lines of the sensor array. This is because the electrical energy generated by different element lines will have encoded within it information regarding the time varying amplitude of the pulsed radiation. For some radiation sources, such as a laser source that is inherently focused at infinity, the spatial extent of the laser source, on the array of sensor elements will be approximately the same size as a sensor element, when the laser radiation is gathered and projected onto the array of sensor element's by a conventional camera lens. The inventors have shown that irradiating at least a portion of the sensor array (for instance through beam spreading or defocusing) allows a laser source, or indeed other pulsed radiation sources to be detected. Irradiating at least a 'portion' of the array is therefore intended to mean spreading the pulsed radiation out such that it is simultaneously incident upon multiple element lines of the array. This may be implemented through use of a suitable optical means such as an optical configuration using lenses or mirrors to redirect/spread the pulsed radiation onto the array. It is accepted that optical scatter effects may assist in spreading pulsed radiation over the sensor array, but reliance on such would not be sufficient for laser sources of relatively low radiative power (such that scatter is simply not detected by the array), and would be unpredictable in nature (changing scatter effects with varying lines of sight to a pulsed radiation source). Therefore the inventors have shown that actively taking the step of defocusing/redirecting/spreading the pulsed radiation onto the array has a beneficial effect.

The pulsed radiation irradiates at least a portion of the array of sensor elements and is therefore received by the array of sensor elements. The pulsed radiation may irradiate the array along a plurality of pixels of an element line, but preferably as a two dimensional image. The radiation may cover the entirety of, or a portion of, the array of sensor elements. Optionally a lens arrangement adapted to disperse incoming pulsed radiation may be used. The lens arrangement being configured to disperse the pulsed radiation in a predetermined direction, so that the radiation is spread across the array in that direction. This direction should have a component that is in the direction of the rolling shutter operation (and is typically substantially parallel thereto). This can be achieved by means of addition of a one dimensional dispersion element (e.g. a film or layer) or modification to the lenses), such as a series of parallel ridges on the surface thereof, or it could be achieved by adjusting the focal distance of the lens to be different in the different dimensions of the array. This would allow remote sources to be strongly defocused across the array in the direction of dispersion (and more focused in the perpendicular direction). This would provide embodiments of the invention that enable signals to be collected and analysed from more than one source.

Although the pulsed radiation is received by at least a portion of the array of sensor elements, actual detection of the radiation does not occur until the sensor elements convert incident radiation to electrical energy and that electrical energy is stored and then 'read-out' for analysis. For the majority of users of a digital camera it is known that the amount of radiative energy incident upon a sensor element, and therefore the electrical energy generated therefrom, can be limited by virtue of the shutter speed or frame rate of the camera (corresponding to an inter-frame time of the camera). For cameras using CMOS sensors (such as mobile phones), a radiation image is captured according to a rolling shutter operation. In a rolling shutter operation each element line is addressed (allowed to convert incident radiation to electrical energy) for a line integration period. Following the line integration period for a given element line, the electrical energy generated therefrom is 'read-out' for analysis in a data processing system. Each element line must be read-out separately in a rolling shutter operation, and therefore whilst each element line is addressed for the same line integration period, the line integration periods are not initiated simultaneously (as for a global shutter camera) and instead only partially overlap in time. The line integration periods themselves are hidden to a user of a rolling shutter camera, the user simply having the option to adjust the overall inter-frame time (time between start of successive frames) or frame rate of the camera, to vary exposure time of the sensor array. Therefore a user of such a camera is restricted to detecting temporal events occurring at up to approximately the maximum frame rate of the camera.

The use of a rolling shutter operation has become a relatively inexpensive video acquisition method for capturing events occurring at a relatively slow speed in comparison to the frame rate of the camera. Faster events, for instance the rotation of a propeller on an aircraft, will exhibit undesirable effects in a rolling shutter camera such as distortion. Increasing the frame rate up to a maximum frame rate can mitigate some of these issues for some temporal events, but at the expense of reducing overall exposure of the radiation image, which is undesirable for many imaging applications, and as such not an immediately apparent remedy. Furthermore a standard rolling shutter camera inter-frame time comprises a dead-time during which the sensor elements are not being exposed to radiation. Thus for single temporally short events (such as laser pulses) there is a risk that the events simply won't be detected at all.

The inventors have shown that modifying the rolling shutter operation in a rolling shutter camera can deliver a method and apparatus for capturing events occurring at a much higher frequency than the frame rate of a camera (over a much shorter period of time than the inter-frame time of a camera). In accordance with the invention the rolling shutter operation is configured such that each element line in the array of sensor elements is addressed for a predetermined integration period. The term 'addressed' meaning that the particular element line is 'electronically' allowed to convert radiative energy to electrical energy, the electrical energy being stored per sensor element, in for instance, a capacitor.

The predetermined integration period is calculated using an integration period function, the integration period function being a function of an anticipated pulse repetition interval of the pulsed radiation. The inventors have shown that by using different predetermined integration periods for different pulse repetition intervals, or for different ranges of pulse repetition intervals, a rolling shutter operation can be deliberately preconfigured to allow detection of specific forms of pulsed radiation. Furthermore the integration period function enables the predetermined integration period to be adjusted, according to the function, should a first predetermined integration period not be sufficient to detect the pulsed radiation (or if multiple different pulse repetition intervals require detection). The ability to preconfigure and adjust the integration times increases the fidelity of detection of temporal events beyond that currently achievable by a rolling shutter camera, for instance beyond that achievable by adjusting the frame rate alone. The integration period function may be a look-up table held within computer memory on a computer data processor. A user of the first aspect of the invention may identify an anticipated pulse repetition interval to be detected and identify a corresponding predetermined integration time optimised for that anticipated pulse repetition interval, from the integration period function. Alternatively the integration period function may be a formula or calculation that can be performed by a computer data processor to determine a predetermined integration period from an anticipated pulse repetition interval input to the formula or calculation.

The radiation image obtained from the invention is at least a one dimensional (but preferably two dimensional) representation of the electrical energy generated by the sensor elements in the array of sensor elements. When element lines in the array have been exposed, the electrical energy generated from each sensor element may be measured directly, or alternatively electrically transmitted into a processing system such as a computer. Each of the element lines will have been addressed, at least partially, at different times, and so along the dimension of the array along which the element lines were consecutively addressed, the radiation image will include information regarding the time varying nature of the pulsed radiation. The pulsed radiation may then be detected for instance by extracting the spatial extent (in terms of element rows) of features in the radiation image that appear as 'light' features, and knowing the line integration time, calculating a corresponding pulse characteristic such as pulse width or period. Alternatively the 'dark' features in the radiation image may have their spatial extent determined also, and a corresponding pulse repetition interval or frequency determined. The ability to uncover the pulsed nature of the radiation depends on tailoring the modified rolling shutter operation to the format of pulsed radiation being detected in accordance with the invention.

In preferred embodiments of the invention the integration period function is a constant value above a maximum PRI value. The maximum PRI value is a pulse repetition interval. The constant-value may preferably be the inter-frame time of the rolling shutter operation. For pulsed radiation consisting of only a single pulse of radiation, the pulse repetition interval is effectively infinite. The single pulse of radiation could occur at any time during the inter-frame time (time between successive frames), in any one of a number of frames of a rolling shutter camera. The predetermined integration period is therefore maximised to be substantially equal to the inter-frame time, to avoid any 'dead-time' during which no element lines are being addressed. Practically, because each element line must be read-out, which takes a finite amount of time, the predetermined integration period cannot exactly match the inter-frame time for a single element line. Therefore for a single element line there is a true, albeit short, 'dead time'. However because of the overlapping (in time) addressing of multiple element lines in a rolling shutter operation, there exists no true 'dead-time' in the inter-frame time when a plurality of lines of the sensor array are considered as a whole, and therefore the risk of a sensor element not 'seeing' the single pulse of radiation is significantly reduced. The inventors have shown that in practice the maximum PRI value may be 100 ms, and that the predetermined integration period can be usefully set to the inter-frame time for pulse repetition intervals above this value. The inventors have shown that even temporally short (nanosecond) single laser pulses can be detected using this embodiment of the method.

In some embodiments of the invention the integration period function is a continuous function between a minimum PRI value and the maximum PRI value. The minimum PRI value is a pulse repetition interval. The element lines in a rolling shutter camera must be read out individually, this process taking a time duration referred to as the 'read-out time'. Because of the requirement to read-out the element lines one after another, the predetermined integration times can only be minimised to a time period substantially equal to the read-out time. Therefore the minimum PRI value may be that which corresponds to the read-out time of the rolling shutter camera, according to the integration period function. The continuous integration period function may be polynomial or other continuous function, but preferably is the linear function of:

$$Int_{Predet} = aT_{PRI} \quad \text{Equation 1.}$$

Where '$Int_{Predet}$' is the predetermined integration time in seconds, '$T_{PRI}$' is the anticipated pulse repetition interval of the pulsed radiation in seconds, and 'a' is less than or equal to 0.5. To detect pulsed radiation having a finite pulse repetition interval, it is necessary to determine the pulse repetition interval itself. To detect pulsed radiation of this type within a single radiation image, the radiation image must comprise temporal information over at least a single pulse repetition interval (otherwise no evidence of consecutive pulsing will be detected). The total time taken to address all element lines in a rolling shutter operation is referred to as the frame acquisition time. By selecting a predetermined integration period that ensures the frame acquisition time is greater than or equal to the pulse repetition interval, will ensure the radiation image comprises temporal information over a sufficient time period to allow two or more consecutive pulses of the pulsed radiation to be observed. However, for frame acquisition times greater than the pulse repetition interval, there is an increasing risk that all element lines will 'see' a pulse within their own predetermined integration periods. A radiation image would thus exhibit no dark features indicating pulsed radiation. By further requiring the predetermined integration period to be less than or equal to half of the anticipated pulse repetition interval, this effect can be mitigated.

In other embodiments of the first aspect of the invention the integration period function is a stepped function between a minimum PRI value and the maximum PRI value. A stepped function is a function wherein specific ranges of values input to the function each output different respective constant values. In the context of the invention the inventors have shown that a single predetermined integration value may be used to detect a range of anticipated pulse repetition intervals of the pulsed radiation. In particular the stepped function preferably comprises:

$$Int_{Predet}(T_{PRI}) = \begin{cases} 18 \times 10^{-6}, & T_{PRI} \le 1000 \times 10^{-6} \\ 900 \times 10^{-6}, & 1000 \times 10^{-6} < T_{PRI} \le 10 \times 10^{-3} \end{cases} \quad \text{Equation 2}$$

Where '$Int_{Predet}$' is the predetermined integration time in seconds, '$T_{PRI}$' is anticipated pulse repetition interval of the pulsed radiation in seconds. Therefore for anticipated pulse repetition intervals less than or equal to 1000 microseconds, the corresponding predetermined integration time is 18 microseconds. For anticipated pulse repetition intervals between 1000 microseconds and 10 milliseconds, the corresponding predetermined integration time is 900 microseconds. In particular the inventors have demonstrated detection of pulse repetition intervals corresponding to frequencies up to 27 kHz (pulse repetition intervals of approximately 37 microseconds).

In some embodiments of the invention, and particularly those where detection of pulse repetition intervals approximating the row-read out time is required, the predetermined integration period of each element line may be configured to be non-overlapping in time with the predetermined integration period of the other element lines. Rolling shutter cameras were originally not designed or detecting pulsed events. This is because rolling shutter cameras are used for generic image or video capture as an efficient and cheaper alternative to global shutter cameras. Therefore the desire in a rolling shutter is to produce an image or frame in a video that to the user, appears to be a 'snapshot' in time. The integration periods in a rolling shutter camera cannot be simultaneously initiated (owing to a requirement to separately read-out the element lines), but the integration periods do partially overlap in time, such that the overall frame acquisition time is short, and the integration times approximate simultaneous. However, owing to this overlap, a radiation pulse with a pulse duration much shorter than the integration time may actually be 'seen' in the overlap of the integration times of she element lines, and radiation pulsing with a pulse repetition interval of the order of the minimum integration period of the rolling shutter (which may be of the order of the read out time for an element line), may also have multiple pulses integrated per individual element line integration period, thereby losing the 'pulsing' information in the resultant radiation image. The inventors have shown that by reducing the predetermined integration period to be such that each element line is addressed in a non-overlapping (in time) manner, the rolling shutter approach can be adapted to allow for non-ambiguous (in time) detection of relatively high frequency events such as pulsed radiation. This practically means minimising the predetermined integration period of a rolling shutter camera to, for instance approximate the read-out time of the element lines.

In some applications of the invention, the pulse repetition interval of the pulsed radiation being detected is already known, in which case the rolling shutter operation can be setup immediately to allow for detection of the pulsed radiation. In other applications it may be that the pulse repetition interval of the pulsed radiation is not known, in which case it would be necessary to search for the pulsed radiation. For instance, it is possible with the invention to trial a plurality of predetermined integration periods (to cover a range of possible pulse repetition intervals) and analyse the radiation images generated therefrom, to gradually uncover whether pulsed radiation is present. For instance a first predetermined integration period may be double the true pulse repetition interval of the pulsed radiation. In this instance each element line in the array of sensor elements may be addressed when radiation pulses were present, and the respective radiation image would exhibit no pulsed effect. If the predetermined integration period were reduced by half, a similar effect would be seen in the respective radiation image. However, reducing the predetermined integration period by a factor of four, would uncover a pulsing effect. This approach is also advantageous where multiple pulse repetition periods are present, because varying the predetermined integration period would gradually allow for uncovering of different pulsing effects in the respective radiation images. Where the integration period function is a stepped function, the different predetermined integration periods corresponding to different ranges of pulse repetition intervals may be consecutively trialed. For instance, with reference to Equation 2, two radiation images obtained consecutively (one obtained with an 18 microsecond predetermined integration time; one obtained with a 900 microsecond predetermined integration time) could be used to detect pulsed radiation having a pulse repetition interval less than 10 ms (shown experimentally to be between approximately 37 microseconds and 10 ms). The operation of the invention at these pulse repetition intervals is achievable using a Raspberry Pi camera or a rolling shutter camera in a mobile phone. Operation to detect relatively fast pulse repetition intervals is particularly advantageous in terms of speed and density of information that can be encoded within a particular time interval for optical communications.

Pulsed radiation is detected in accordance with the invention by applying a pulse detection operation on the radiation image. In preferred embodiments the pulse detection operation is a Spatial Fourier Transform. The spatial Fourier Transform may be performed in a first array dimension. An array dimension means either along a row of sensor elements, or along a column of sensor elements, however the array dimension chosen is the same dimension along which the element lines of the array were consecutively addressed in the rolling shutter operation. By performing a spatial Fourier Transform the temporal information encoded spatially in the radiation image can be retrieved efficiently. For instance the pulse repetition interval of a pulsed radiation source, as represented by 'light' and 'dark' element lines in the radiation image, can be retrieved. In scenarios where the irradiance falling upon a sensor element is relatively low, the electrical energy generated by each sensor element in an element line may be integrated, the Fourier transform then acting on the integrated values of each of the element lines. Furthermore spatially separated radiation sources, simultaneously irradiating the array of sensor elements, will be 'imaged' onto the array of sensor elements at different locations, and can have their respective pulse repetition intervals uncovered, by taking a spatial Fourier transform along array dimensions where the respective 'images' are formed.

The inventors have shown that a spatial Fourier transform is most effective at recovering the pulse repetition interval of a pulsed radiation source when the pulsed radiation source is a modulated continuous wave source. For embodiments of the method wherein the pulsed radiation is, for instance, laser pulses from a Q switched laser, the nature of the laser pulses (very temporally short, individually approximating a delta function, or delta comb function if a plurality of pulses) may require a different pulse detection operation. For instance preferred embodiments may use an algorithm acting on the pixel values in the radiation image, to detect an increasing pixel value and subsequently decreasing pixel value, in a particular array dimension. Rising pixel values followed by falling pixel values may indicate the presence of a radiation pulse.

In some embodiments of the method the array of sensor elements comprises an array of primary sensor elements and an array of secondary sensor elements, such that the step of obtaining a radiation image comprises obtaining both a primary radiation image and a secondary radiation image. The primary sensor elements and secondary sensor elements may exhibit a different wavelength dependent response, or may be responsive to entirely different wavelengths altogether. Alternatively the primary and secondary sensor elements may have optical filters that filter the wavelength of radiation incident upon them. The arrays may be collocated, or located separate from each other, the pulsed radiation reaching each array by virtue of a beam splitter. Whichever embodiments are used, the relative stimulations of the pixels in each array allows for pulsed radiation of different wavelengths can be detected (i.e. the primary array may be stimulated and the other not, indicating a wavelength within the responsivity of the primary array and not within the responsivity of the secondary array). Even more preferred embodiments comprise the additional step of comparing the primary radiation image with the secondary radiation image and determining a wavelength of the pulsed radiation therefrom. Different wavelength radiation may stimulate the primary and secondary elements differently, thus their relative stimulations (for instance electrical charge generated) can be analysed, along with the known wavelength responsivity of the sensor elements, to determine information regarding wavelength.

In preferred embodiments of the method, upon detecting pulsed radiation, a protection means may be triggered. Pulsed radiation, in particular pulsed laser radiation may be damaging to the device upon which the method of the invention is being operated, or may be damaging to a device that is connected or in communication with the device upon which the method is operated. Therefore, it is advantageous to be able to activate or trigger protection means to protect said devices from damage. The protection means may be simply a reduction in gain applied to the sensor elements, or may be the introduction of a neutral density filter in front of the array of sensor elements or in front of another sensor.

The protection means may be a command to steer the device away from the current pointing direction and therefore away from the pulsed radiation itself, or may be a warning to not observe a particular viewing angle.

In preferred embodiments of the invention the pulsed radiation is pulsed laser radiation. Pulsed laser radiation can be utilised in many applications, in particular for communications, owing to the narrow divergence of a laser delivering pulsed radiation at greater ranges than a different radiation device, and the high pulse repetition rates achievable. Therefore the ability to modify a rolling shutter camera, already available in many electronic devices to provide a laser based communications capability, is particularly advantageous.

According to a second aspect of the invention there is provided a method of optical communication, the method comprising the steps of: modulating a radiation source to generate pulsed radiation having a pulse repetition interval; transmitting the pulsed radiation towards a receiver; and the receiver exercising the method of the first aspect of the invention.

The radiation source may be modulated with a known pulse repetition interval to generate pulsed radiation, the radiation source being directed towards a receiver so as to transmit the pulsed radiation to the receiver. The receiver is the intended recipient of the pulsed radiation and may be a user of an array of sensor elements, or simply the array of sensor elements themselves operating autonomously. A simple communication may be detecting the presence of the pulsed radiation, for instance to stimulate another device to activate. A more complex communication may be a series of pulses, or a series of pulses with modulations on the pulses, in order to communicate more complex information. The benefit of the invention is that a rolling shutter type device in a mobile phone or camera could be modified at relatively low cost to provide such a communication capability.

According to a third aspect of the invention there is provided a pulsed radiation detector for detecting pulsed radiation, the detector comprising an array of sensor elements arranged in element lines, means for irradiating at least a portion of the array of sensor elements with the pulsed radiation, and a computer data processor, wherein the computer data processor is configured to: Calculate a predetermined integration period using a integration period function, the integration period function being a function of an anticipated pulse repetition interval of the pulsed radiation to be detected; configure a rolling shutter operation to address each of the element lines for the predetermined integration period; address the element lines using the rolling shutter operation; obtain a radiation image from the array of sensor elements; and then apply a pulse detection operation to the radiation image, thereby detecting the pulsed radiation.

In some embodiments of the pulsed radiation detector the means for irradiating at least a portion of the array comprises a wide angle lens. The wide angle lens may be a fish-eye lens so as to achieve a substantially hemispherical field of view. One or more lenses (e.g. wide angle lenses) may be combined so as to provide a combined 360 degree field of view.

The array of sensor elements may be a CMOS sensor inside a mobile phone, digital camera, or digital video camera. Such a CMOS sensor may be augmented with defocusing optics to spread received pulsed radiation over a plurality of element lines in the array of sensor elements. The computer data processor may be the mobile phone or camera itself, or a separate computer system interfacing with the array of sensor elements (directly via electrical connection or wirelessly). A user may input to the computer data processor a pulse repetition frequency to be detected, the computer system configuring the rolling shutter operation using an integration period function stored in computer memory or in computer software. The addressing of the element lines may also be controlled by software embedded within the computer data processor.

When processing a radiation image it may be necessary to apply a detection algorithm to identify pixels that are within the locus of a pulsed radiation beam and those that are not. This is so only relevant pixels are processed. For embodiments where the locus of the pulsed radiation beam is substantially circular, some circle detection algorithms can fail owing to striped effect (the 'light' and 'dark' regions) in the radiation image. The inventor has found that blurring the radiation image allows this locus to be successfully detected using such circle detection algorithms. The subsequent pulse detection operation can then be applied to the original unblurred radiation image, within the confines of the locus of the radiation beam.

Furthermore in some embodiments it may be necessary to apply a noise threshold to the radiation image prior to application of the pulse detection operation. This improves the contrast of the 'light' and 'dark' regions in the radiation image.

BRIEF DESCRIPTION OF THE DRAWINGS

Embodiments of the invention will now be described by way of example only and with reference to the accompanying drawings, in which:

FIG. 1a shows an illustration of an array of sensor elements forming the CMOS sensor in a mobile phone;

FIG. 3b shows an illustration of a radiation image generated by the prior art rolling shutter operation of FIG. 3a;

FIG. 4b shows an illustration of a radiation image generated by the embodiment of the invention of FIG. 4a;

DETAILED DESCRIPTION

FIG. 1a shows an illustration of an array 10 of sensor elements 11 forming the CMOS sensor in a mobile phone camera. The array of sensor elements 10 comprises element lines A→F. When a scene comprising a laser source is imaged, the laser radiation 12 is focused to a point like source in the plane of the array of sensor elements 10. Therefore only a single sensor element is irradiated.

Figure 1B:
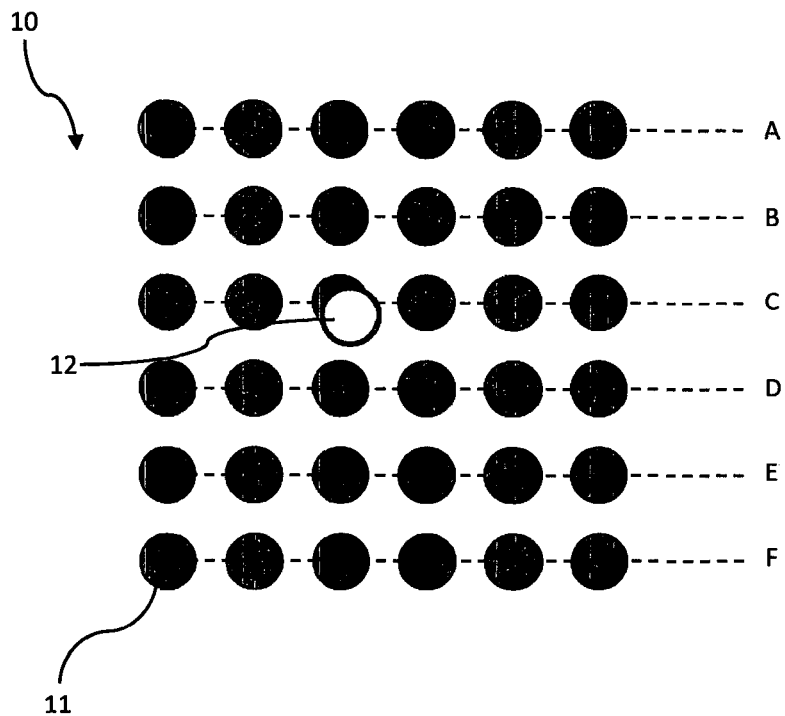
FIG. 1b shows an illustration of an array of sensor elements forming the CMOS sensor in a mobile phone when imaging spread laser radiation.
Figure 1B:
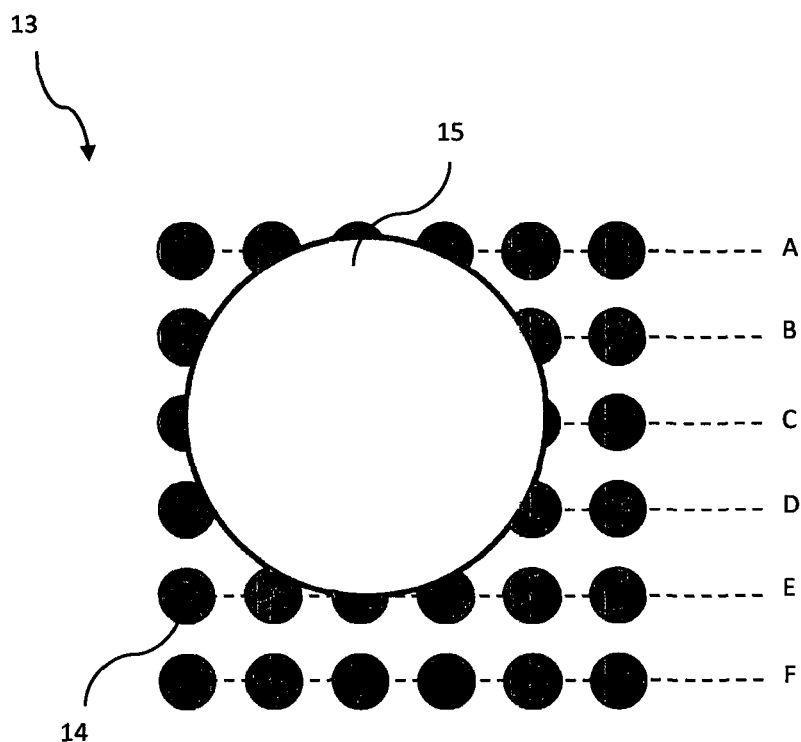

FIG. 1b shows an illustration of an array 13 of sensor elements 14 forming a CMOS sensor of a mobile phone camera. The array of sensor elements 13 also comprises element lines A→F. In this illustration the mobile phone camera has been improved in accordance with the invention by defocusing the laser radiation 15 prior to irradiating the array of sensor elements 13. Therefore a plurality of sensor elements 14 are irradiated.

Figure 2:
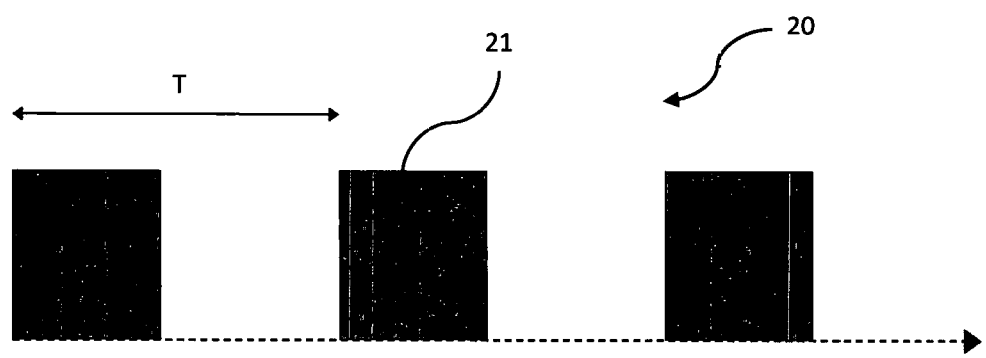
FIG. 2 shows an illustration of pulsed laser radiation in the form of modulated continuous wave radiation.

FIG. 2 shows an illustration of pulsed laser radiation 20 comprising a series of pulses 21 separated in time by a pulse repetition interval T.

Figure 3A:
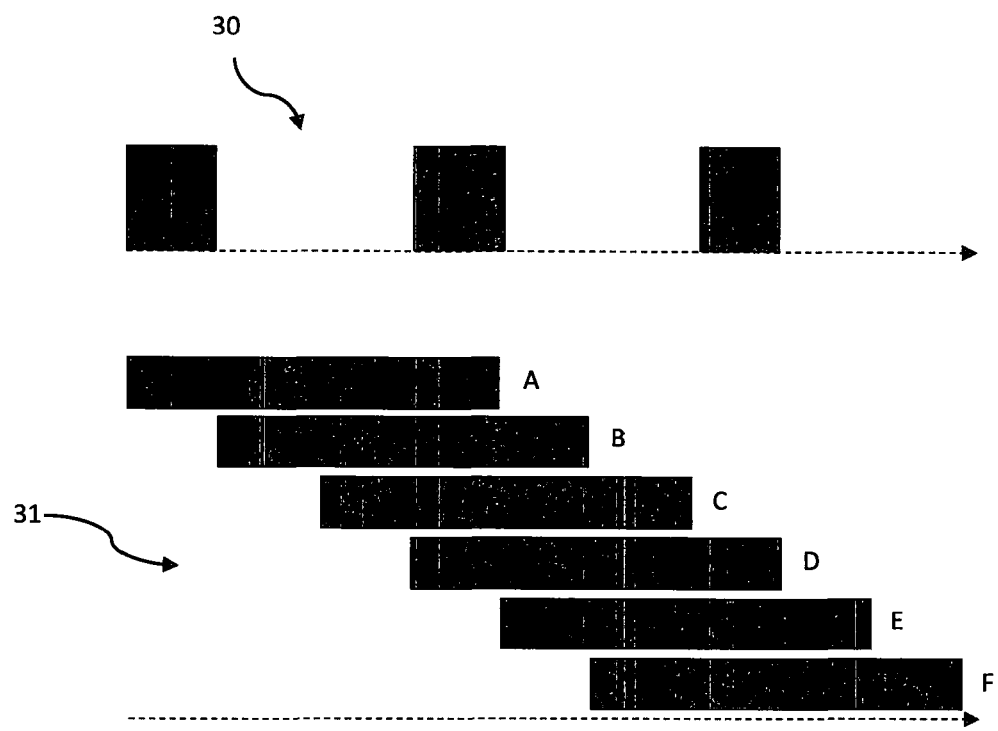
FIG. 3a shows an illustration of a prior art rolling shutter operation attempting to acquire and detect spread pulsed laser radiation.
Figure 3B:
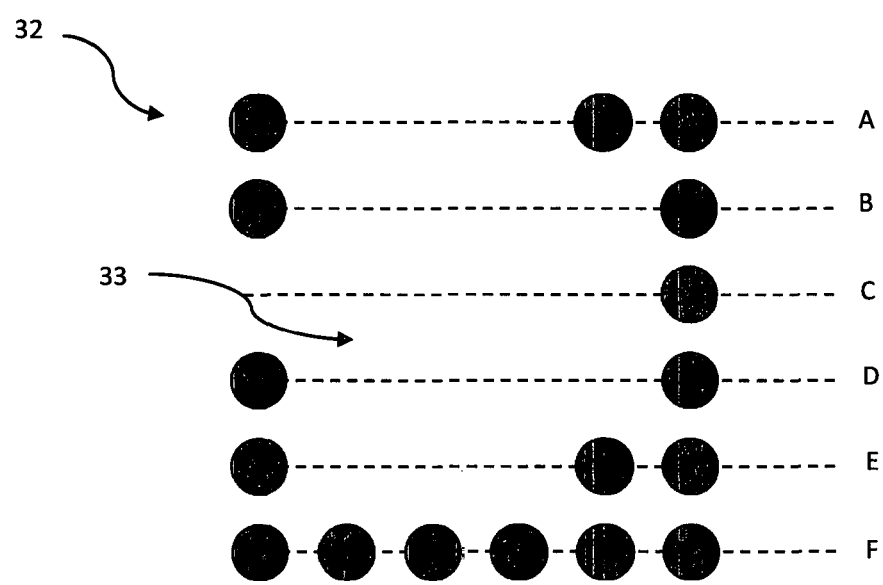

FIG. 3a shows an illustration of pulsed laser radiation 30 and an illustration of the prior art rolling shutter operation 31 used in a mobile phone camera. The laser radiation 30 and rolling shutter 31 are shown on the same timeline as indicated by the dotted arrows in the figure. The rolling shutter operation 31 comprises a plurality of integration times A→F corresponding to the integration time of each of the element lines A→F in FIG. 1b i.e. element line A is addressed first, then element line B, element line C, etc. Considering the integration time A in FIG. 3a, it can be seen that the first two pulses of pulsed laser radiation 30 occur within this integration time. Therefore element line A in FIG. 1b will integrate both laser pulses in a single integration time. It can also be seen from FIG. 3a that the second pulse of pulsed laser radiation 30 occurs within the integration times for A, B, C, and D. Therefore element lines A→D in FIG. 1b will 'see' this laser pulse during their respective integration times. The net effect of the duration of the element line integration times, and their overlapping nature, is shown in FIG. 3b. FIG. 3b shows the array of sensor elements of FIG. 1b but after each element line A→F has been exposed to the pulsed laser radiation for the overlapping integration times shown in FIG. 3a. FIG. 3b therefore shows a radiation image 32 of the pulsed laser radiation. The black or 'dark' dots indicate sensor elements that were not stimulated (or did not 'see') the pulsed laser radiation. The white or 'light' region 33 (and the lack of dots by comparison with FIG. 1b) shows the region of the array of sensor elements where pulsed laser radiation was 'seen' by the sensor elements. Whilst the overall spatial image of laser radiation 33 has; been reproduced, there is no indication of the radiation being pulsed. Therefore for this prior art configuration of rolling shutter, the laser radiation would not be resolved as pulsed laser radiation.

Figure 4A:
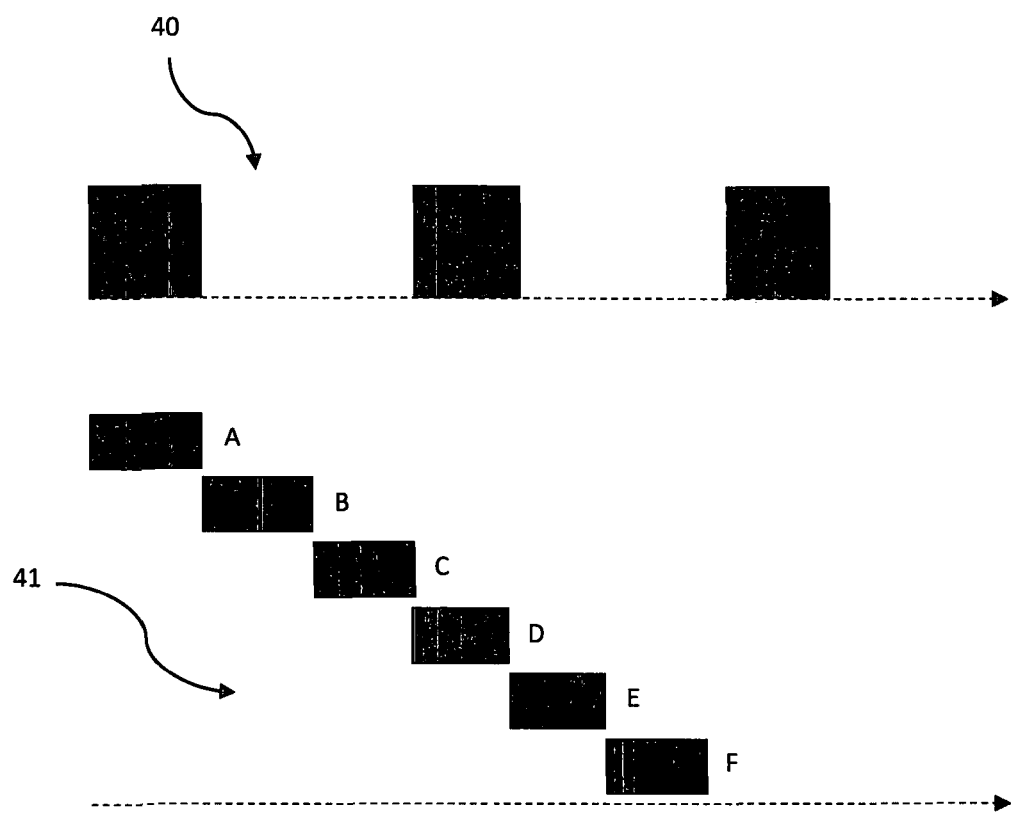
FIG. 4a shows an illustration of an embodiment of the first aspect of the invention when imaging spread pulsed laser radiation.

FIG. 4a shows an illustration of a modified rolling shutter operation wherein the element line integration times have been modified in accordance with the method of the invention to become predetermined integration periods 41. The predetermined integration periods A→F correspond to the respective element lines in FIG. 1b. Also shown in the figure is the same pulsed laser radiation 40 as shown in FIG. 3a. It can be seen from the figure that the predetermined integration periods A→F have been configured such that they do not overlap in time, meaning each predetermined integration period corresponds to a separate instance of time. Additionally it can be seen that, the predetermined integration periods A→F have been chosen such that each of the laser pulses in pulsed laser radiation 40 only occur in a single element line's predetermined integration period. Such a configuration is achievable through knowledge of the format of the pulsed radiation (for instance the pulse repetition interval).

Figure 4B:
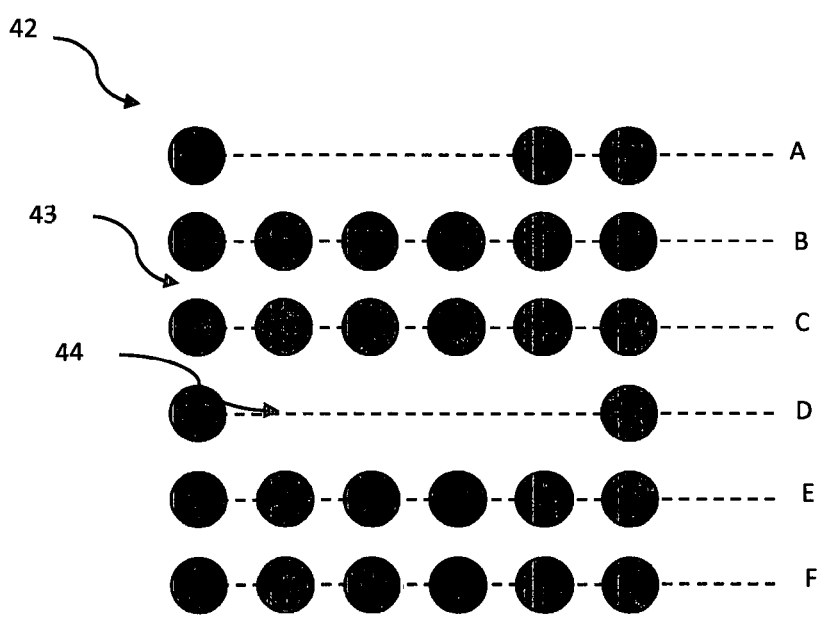

The net result of such a configuration is shown in FIG. 4b as a radiation image 42. By comparison with FIG. 3b there is now a clear pattern of dark regions 43 and light regions 44. The radiation image 42 now clearly shows the laser radiation is pulsed laser radiation. Furthermore, knowing that the dark region 43 extends over two element lines (B and C) and that light region 44 extends over one element line, and knowing the predetermined integration period, the pulse repetition period can be determined. Alternatively, and more preferably, a spatial Fourier transform along the second column of image 42 is performed to determine a pulse repetition frequency (and therefore the repetition period).

Figure 5:
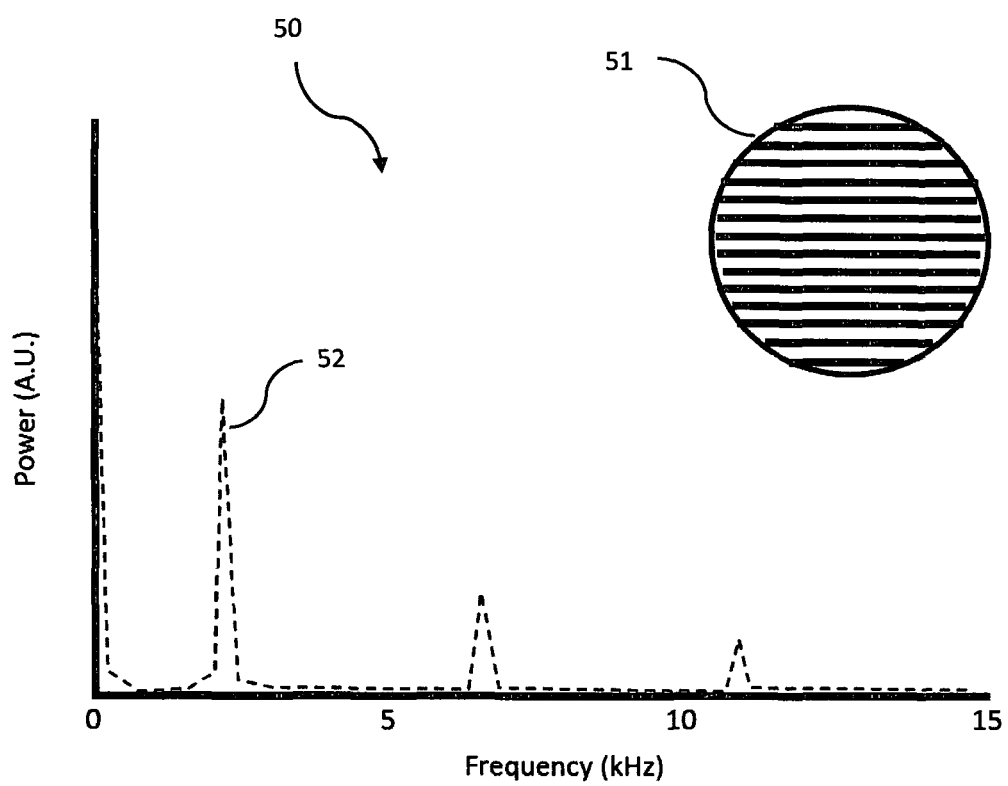
FIG. 5 shows an illustration of the result of performing a spatial Fourier Transform of a radiation image generated from an embodiment of the first aspect of the invention.

FIG. 5 shows the results of an embodiment of the method 50 comprising the step of performing a Fourier transform. Defocused laser radiation from a 520 nm laser pulsing with a repetition frequency of 2 kHz was used to irradiate a Raspberry Pi camera. The generated radiation image 51 is 200 sensor elements (pixels) in diameter. There is a clear pattern of dark and light element lines in the laser radiation 51. By performing a Fourier transform along a pixel column of radiation image 51, the frequency spectrum shown in FIG. 5 was generated. Clearly shown is the true pulse repetition frequency 52. Other spikes in the frequency spectrum can be removed by thresholding against a power value, and the spike at 0 kHz is typical of such frequency spectrums and therefore expected.

Figure 6A:
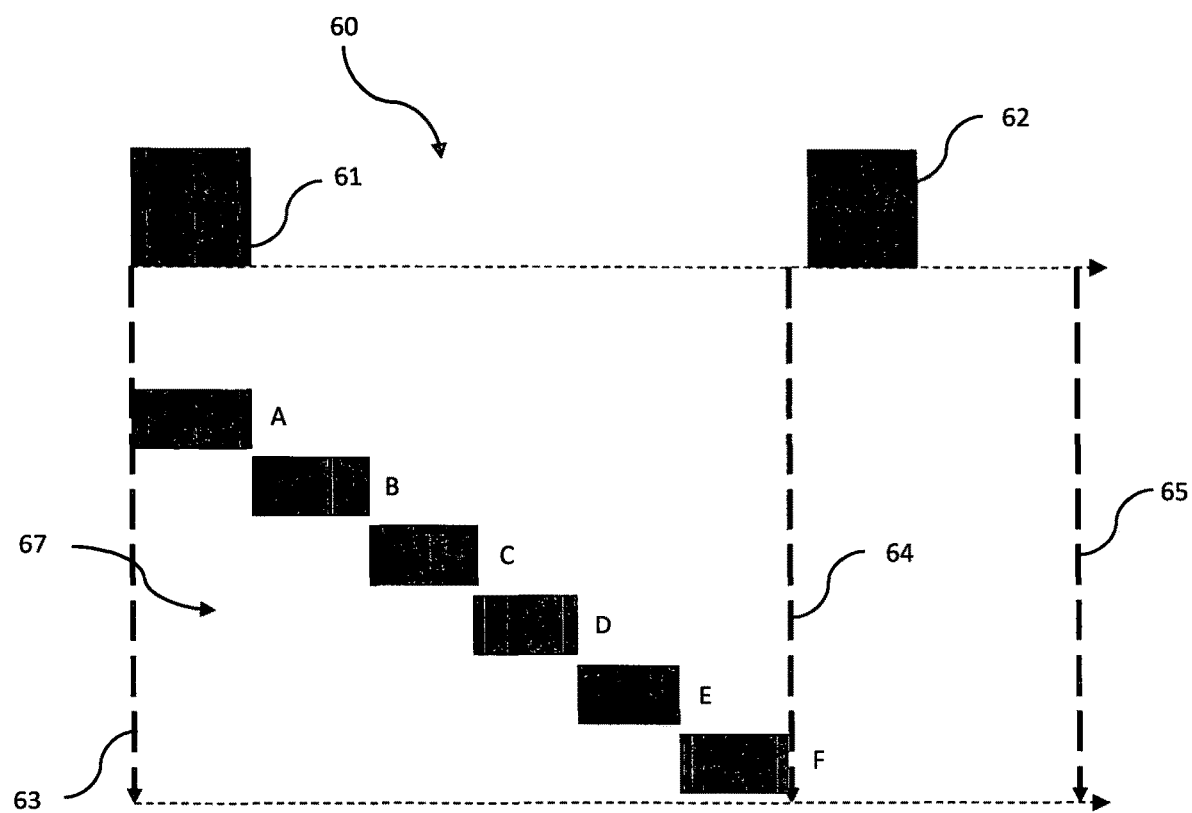
FIG. 6a shows an illustration of a rolling shutter operation wherein the predetermined frame acquisition time is less than a pulse repetition interval of pulsed radiation.
Figure 6B:
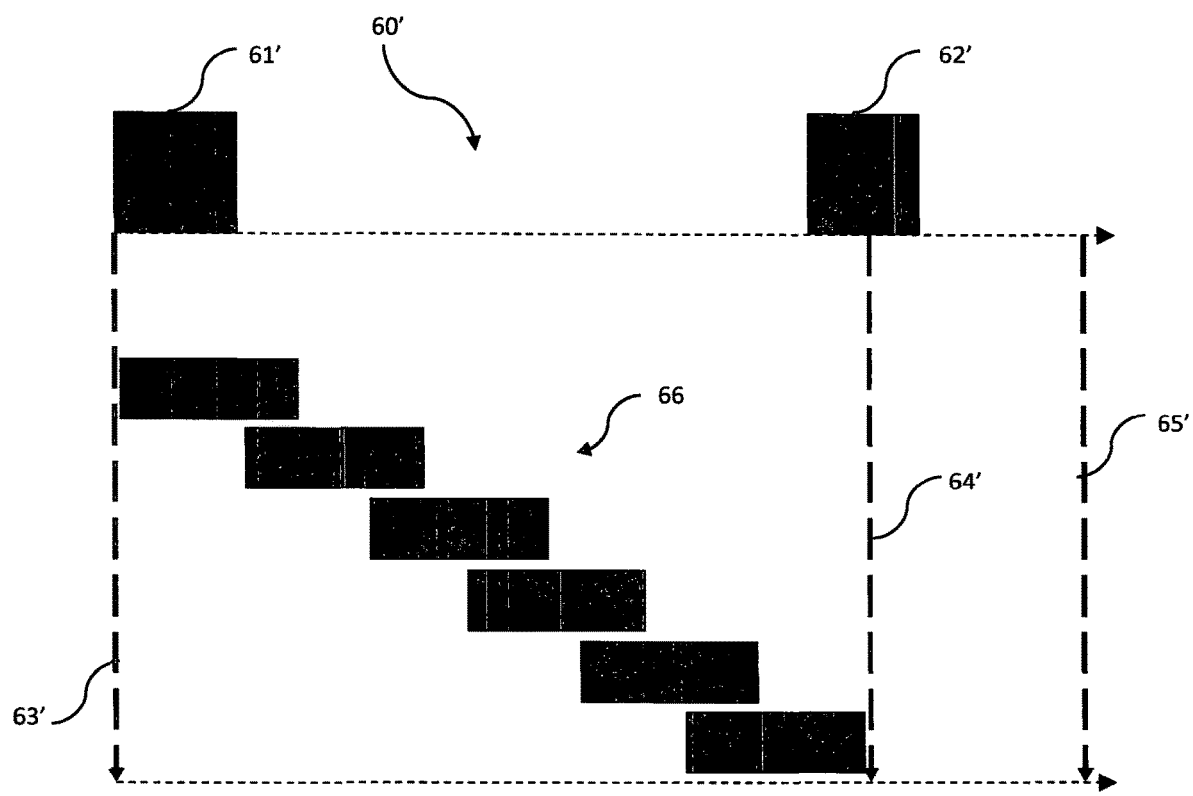
FIG. 6b shows an illustration of an embodiment of the invention wherein the predetermined frame acquisition time is substantially equal to a pulse repetition interval of pulsed radiation.

FIG. 6a shows pulsed laser radiation 60 comprising two pulses 61 and 62 separated by a pulse repetition interval. A modified rolling shutter operation is also shown 67 that uses a frame acquisition time beginning at time 63 and finishing at time 64. An inter-frame time is also shown as starting at time 63 and finishing at time 65 (the inter-frame, time corresponding to a frame rate of the camera using the rolling shutter). Integration periods A→F are also shown. The illustration shows that pulse 61 resides within the frame acquisition time, but pulse 62 does not. Instead pulse 62 resides within the 'dead-time' between the end of the frame acquisition time and end of the inter-frame time 65. Therefore only pulse 61 will be observed in a radiation image and the pulse repetition interval not recovered. In contrast FIG. 6b illustrates the advantage of ensuring the frame acquisition time (defined by the bounds of 63' and 64') is at least equal to the pulse repetition interval of radiation 60'. The predetermined integration periods 66' have been configured such that, although they are longer than those of FIG. 6a, and although they partially overlap, they achieve a frame acquisition time that covers the start of both pulse 61' and 62'.

Figure 7:
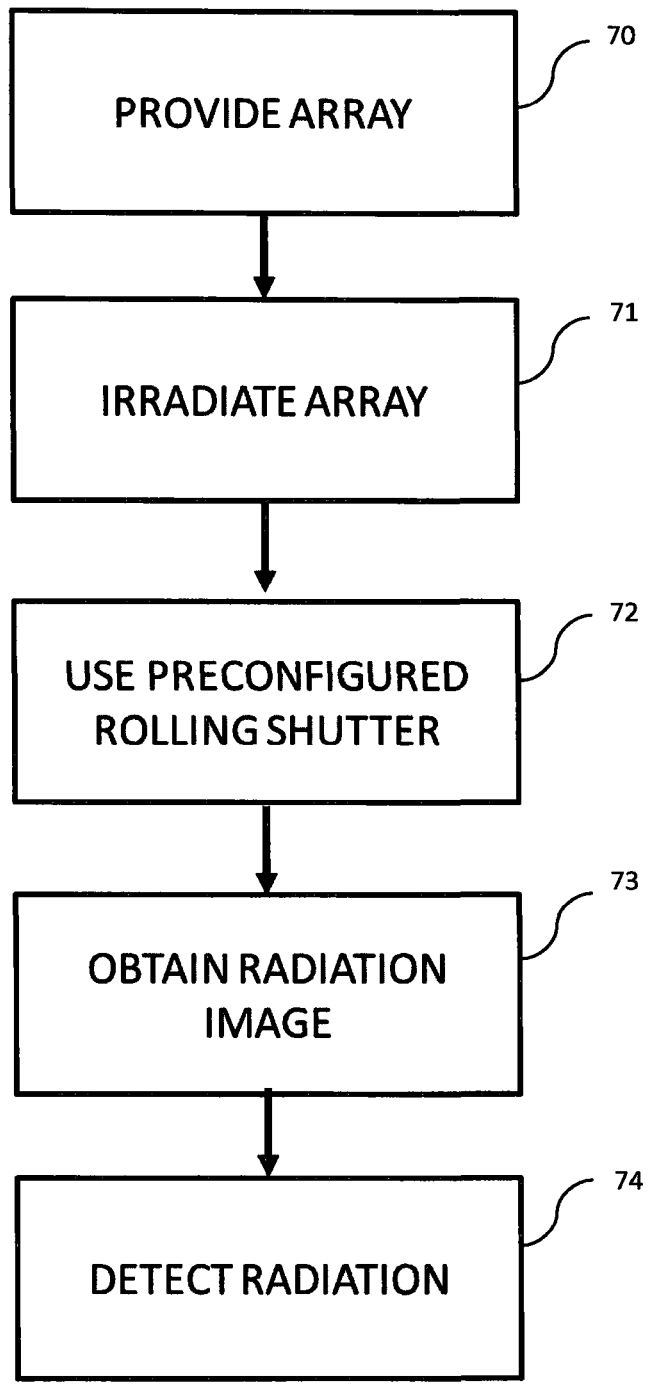
FIG. 7 shows a flow diagram of some embodiments of the invention.

FIG. 7 shows a flow diagram illustrating an embodiment of the method the invention. The step 'provide array' 70 represents the requirement to provide an array of sensor elements, the sensor elements being arranged as element lines. The step 'irradiate array' 71 represents the requirement to irradiate at least a portion of the array of sensor elements with the pulsed radiation. The step 'use preconfigured rolling shutter' 72 represents the requirement to address each element line of the array of sensor elements, each element line being addressed for a predetermined integration period calculated using an integration period function. The step 'obtain radiation image' 73 represents the requirement to process the output of the array of sensor elements to generate a radiation image and then detect the pulsed radiation 74 based on the spatial information provided in the radiation image.

Figure 8:
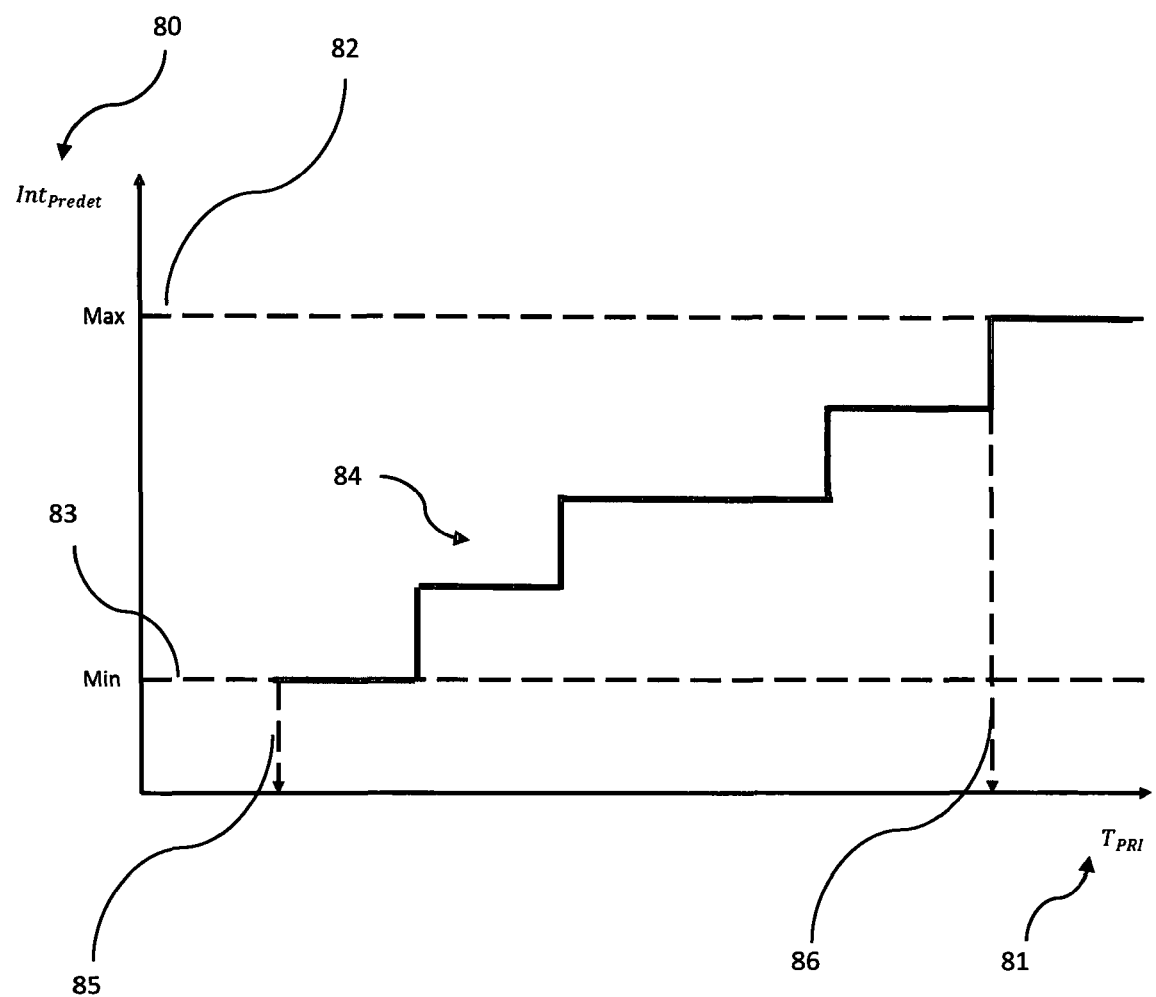
FIG. 8 shows an illustration of an embodiment of an integration period function of the invention.

FIG. 8 shows an illustration of an integration period function 80 as a function of anticipated pulse repetition interval 81. The function 80 has a maximum value 82 equal to an inter-frame time of a rolling shutter operation. The function 80 has a minimum value 83 equal to the row read-out time of the rolling shutter operation. Between the maximum value 82 and minimum value 83, the function 80 is a stepped function 84. The stepped function 84 comprises a plurality of values, each value being constant across a specific range of anticipated pulse repetition intervals. The stepped function 84 is used to select a predetermined integration time 80 based on a corresponding anticipated pulse repetition interval 81, to ensure the pulse repetition interval is detectable from a radiation image obtained from the rolling shutter operation of the invention. For anticipated pulse repetition intervals 81 less than that corresponding to the minimum value 85, the predetermined integration period 80 is set at the minimum value 83 but the repetition interval may not be detectable. For anticipated pulse repetition intervals 81 greater than that corresponding to the maximum value 86 the predetermined integration period is, set at the maximum value 82, which the inventor has shown to be the inter-frame time. The inventors have shown that a single non-repeating pulse of radiation can be detected in this regime. The inventors have also shown experimentally that the minimum detectable pulse repetition interval (equivalent to 85 in this Figure) can be as low as 37 microseconds.

Whilst the figures illustrate pulsed radiation irradiating an array of sensor elements over a circular portion of the array, the array may also be irradiated over non-circular portions. For instance a substantially linear portion of the array may be irradiated.

The invention claimed is:

1. A method of detecting pulsed radiation, comprising the steps of:
   providing an array of sensor elements, the sensor elements being arranged in element lines;
   receiving pulsed radiation;
   irradiating at least a portion of the array of sensor elements with the pulsed radiation;
   addressing the array of sensor elements using a rolling shutter operation;
   reading the array of sensor elements to obtain a radiation image; and then
   applying a pulse detection operation to the radiation image, thereby detecting the pulsed radiation;
   wherein the step of addressing the array of sensor elements comprises:
   calculating a predetermined integration period using an integration period function, the integration period function being a function of an anticipated pulse repetition interval of the pulsed radiation;
   configuring the rolling shutter operation to address each of the element lines for the predetermined integration period; and then
   addressing the element lines.

2. The method of claim 1 wherein the integration period function is a constant-value above a maximum PRI value.

3. The method of claim 2 wherein the constant-value is an inter-frame time of the rolling shutter operation.

4. The method of claim 2 wherein the integration period function is a continuous function between a minimum PRI value and the maximum PRI value.

5. The method of claim 4 wherein the continuous function is:

$$Int_{Predet} = \alpha T_{PRI}$$

where '$Int_{Predet}$' is the predetermined integration time in seconds, '$T_{PRI}$' is the anticipated pulse repetition interval of the pulsed radiation in seconds, and '$\alpha$' is less than or equal to 0.5.

6. The method of claim 2 wherein the integration period function is a stepped function between a minimum PRI value and the maximum PRI value.

7. The method of claim 6 wherein the stepped function comprises:

$$Int_{Predet}(T_{PRI}) = \begin{cases} 18 \times 10^{-6}, & T_{PRI} \leq 1000 \times 10^{-6} \\ 900 \times 10^{-6}, & 1000 \times 10^{-6} < T_{PRI} \leq 10 \times 10^{-3} \end{cases}$$

where '$Int_{Predet}$' is the predetermined integration time in seconds, '$T_{PRI}$' is the anticipated pulse repetition interval of the pulsed radiation in seconds.

8. The method of claim 1 wherein the pulse detection operation is a spatial Fourier Transform.

9. The method of claim 1 wherein the pulse detection operation comprises the step of identifying the rise and fall of pixel values of the radiation image.

10. The method of claim 1 wherein the array of sensor elements comprises an array of primary sensor elements and an array of secondary sensor elements, the step of obtaining a radiation image comprising obtaining both a primary radiation image and a secondary radiation image.

11. The method of claim 1 wherein the step of detecting the pulsed radiation comprises the step of:
    comparing a primary radiation image with a secondary radiation image and determining a wavelength of the pulsed radiation therefrom.

12. The method of claim 1 further comprising the additional step of triggering a protection means upon detection of the pulsed radiation.

13. The method of claim 1 wherein the pulsed radiation is pulsed laser radiation.

14. The method of claim 1 wherein the step of irradiating at least a portion of the array of sensor elements comprises irradiating a single element line with the pulsed radiation.

15. A method of optical communication, the method comprising the steps of:
    modulating a radiation source to generate pulsed radiation having a pulse repetition interval;
    transmitting the pulsed radiation towards a receiver; and
    the receiver exercising the method of claim 1.

16. A pulsed radiation detector comprising an array of sensor elements arranged in element lines, means for irradiating at least a portion of the array of sensor elements with the pulsed radiation, and a computer data processor, wherein the computer data processor is configured to:
    calculate a predetermined integration period using an integration period function, the integration period function being a function of an anticipated pulse repetition interval of the pulsed radiation to be detected;
    configure a rolling shutter operation to address each of the element lines for the predetermined integration period;
    address the element lines using the rolling shutter operation;
    obtain a radiation image from the array of sensor elements; and then
    apply a pulse detection operation to the radiation image, thereby detecting the pulsed radiation.

17. The pulsed radiation detector of claim 16 wherein the means for irradiating at least a portion of the array of sensor elements comprises a wide angle lens.

* * * * *